Sept. 29, 1964     R. S. WOOD     3,150,673
CENTRIFUGAL GOVERNORS
Filed July 25, 1961     2 Sheets-Sheet 1
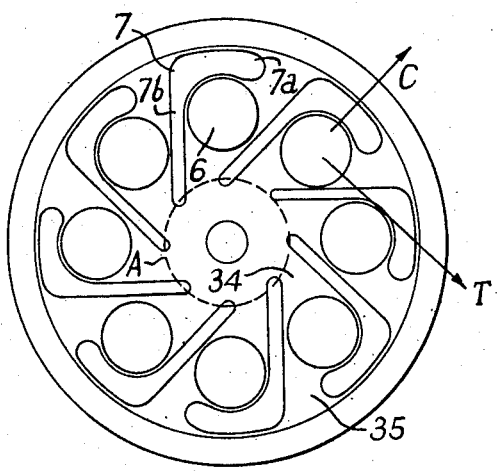
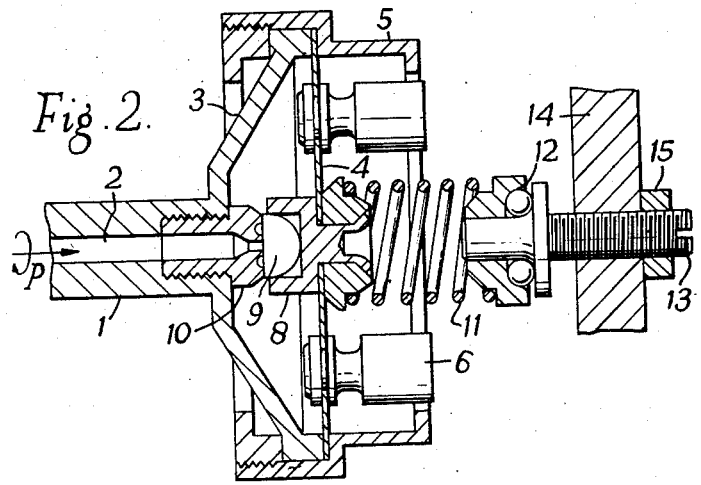
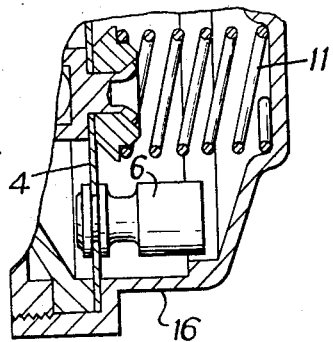
Robert S. Wood
Inventor
By William E. P. Barghy
Attorney Sept. 29, 1964 R. S. WOOD 3,150,673
CENTRIFUGAL GOVERNORS
Filed July 25, 1961 2 Sheets-Sheet 2

Robert S. Wood
Inventor
By William E. P. Bengly
Attorney.

United States Patent Office 3,150,673
Patented Sept. 29, 1964

3,150,673
CENTRIFUGAL GOVERNORS
Robert Spurgeon Wood, Romford, England, assignor to The Plessey Company Limited, London, England, a British company
Filed July 25, 1961, Ser. No. 128,309
Claims priority, application Great Britain, Aug. 8, 1960, 27,433/60
5 Claims. (Cl. 137—56)

This invention relates to centrifugal governors and has for an object to provide an improved centrifugal governor which will produce movement of a control element axially of the governor shaft with a minimum of hysteresis, more particularly of hysteresis due to friction.

According to the invention the governor comprises a diaphragm mounted on the governor shaft for rotation about an axis perpendicular to the surface of the diaphragm or, when the diaphragm surface has the shape of a curved surface of revolution, about the axis of the said surface, the diaphragm being either mounted on the governor shaft at the circumference of the diaphragm and connected at its centre to the control element or vice versa, and a number of centrifugal elements are secured on the diaphragm, distributed round the axis of rotation so as to be dynamically balanced with relation thereto, and projecting to one side of the diaphragm so that centrifugal action will cause the diaphragm to be deflected axially of the governor shaft. While the resilience of the diaphragm itself may be utilised to constitute a bias, it is generally preferred to provide an external bias, provided for example by a helical spring arranged co-axially with the diaphragm and opposing such axial displacement thereof.

In order to increase the amount of deflection available, the diaphragm is preferably perforated between the centrifugal elements in such manner that these elements are each supported by a spoke-like arm which is inclined to the radial direction in the plane of the diaphragm so as to extend tangentially to a central portion of the diaphragm.

The governor according to the invention may be arranged to operate the valve element of a fluid-control valve arranged co-axially with the governor shaft. This valve may be arranged on the shaft itself so as to rotate with the shaft, or it may be stationary, a thrust bearing, preferably a ball thrust bearing or similar anti-friction thrust bearing, being interposed between the diaphragm and the valve element in the latter case.

In the drawing accompanying the specification

FIGURE 1 is an end view of one form of diaphragm equipped with centrifugal members according to the present invention.

FIGURE 2 is an axial section of one form of governor according to the invention incorporating the diaphragm of FIGURE 1.

FIGURE 3 is a fragmentary axial section illustrating a modification.

Figure 4:
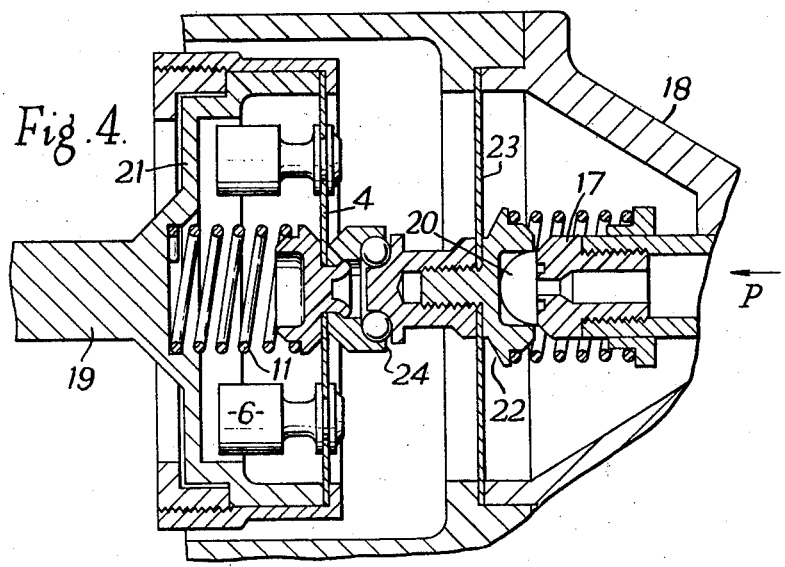
FIGURE 4 is an axial section of another form of governor incorporating the invention.

Referring first to FIGURES 1 and 2, the governor is illustrated mounted on the shaft 1 of a gear-type fuel pump. This shaft, which constitutes the governor shaft, has an axial bore 2 which communicates permanently with the pressure side of the pump. The shaft 1 is provided with a flange having a collar 3 to which a diaphragm 4 is clamped by a cap nut 5. Centrifugal elements in the form of weights 6 are secured on the diaphragm 4, uniformly distributed at equal distances from the axis, all the weights 6 extending axially from the diaphragm in the same direction. In order to increase the flexibility of the diaphragm, the latter is provided with eight slots 7, each slot being substantially L-shaped, having a substantially circumferential leg 7a at the outer side of the weights 6 and a second leg 7b which is tangential to a circle A of a radius considerably smaller than that of the circle on which the weights 6 are secured. This leaves each weight 6 secured on a spoke-like portion which is connected to the remainder of the diaphragm by two narrow portions 34, 35. When the shaft 1 rotates, centrifugal force tends to bend the weights 6 away from the axis and thus to move the centre of the diaphragm away from the shaft 1, and while with a flat diaphragm having radial spokes, such movement would involve the necessity of a longitudinal stretching of the spokes, the described construction of the diaphragm permits the centre of the diaphragm to move axially of the governor shaft with relatively little resistance since the necessary lengthening of the spokes interconnecting the circumference of the diaphragm with the part inside the circle A can be compensated for, if the centre portion is allowed to rotate slightly about its axis so as to make the spokes more nearly radial, by the resultant shortening of the necessary length of the spokes for a given axial position of the centre of the diaphragm. The centre of the diaphragm carries a socket member 8 fitted with a hemispherical valve element 9 which co-operates with a valve seat 10 secured in the shaft 1 at the end of the bore 2 so that element 9 closes the aperture in the valve seat 10 when the valve element 9 is in its illustrated position of rest. The socket 8 and valve member are, at low speed of the shaft, retained in this position of rest by a preloaded spring 11, which is supported by a ball thrust bearing 12 on a screw-threaded shaft 13. This shaft is adjustable in its axial direction in a stationary support member 14 to impart to the spring 11 an adjustable pre-load, and it can be locked in position by a counter-nut 15. When the axial force exerted upon the centre portion of the diaphragm by the action of the centrifugal weights 6 is sufficient to overcome the pre-load of spring 11, the valve 9 opens to allow fuel from passage 2 to be spilled, thereby reducing the amount of fuel supplied by the fuel pump to the combustion chamber of a turbine or other engine.

Since the spokes which are to be deflected by the centrifugal weights extend at an angle to the radial direction, only a component of the centrifugal force will act to produce axial displacement of the centre of the diaphragm, and for the same reason inertia forces produced by positive or negative acceleration of the governor shaft 1 will also have a component contributing to the axial displacement of the valve member 9. This is indicated in FIGURE 1 by two arrows of which one is marked C and represents the centrifugal force while the other is marked T and represents the tangential inertia force due to acceleration.

It will be observed that these forces are each disposed at approximately 45° to the direction determined by the two ends of the spoke member which carries one of the centrifugal weights 6, so that in this embodiment the centrifugal and acceleration forces share equally in the axial deflection force produced at the centre of the diaphragm.

FIGURE 3 shows a simplified form of the invention, in which the cap nut 5 is replaced by an extended cap nut 16 against which the loading spring 11 is supported. While this construction does not permit ready adjustment of the loading, at least while the shaft is rotating, it avoids the need of interposing a thrust bearing between the end of the spring 11 and the stationary part of the device; moreover it ensures that the spring loading remains an internal force of the rotary system.

FIGURE 4, in which the parts corresponding to FIGURES 1 and 2 bear the same references, shows a modification in which the valve seat 17 is arranged in the stationary part 18 of the device, thus making it possible to use a plain governor shaft 19 having no centre bore. This construction requires the valve element 20 to be moved towards the governor shaft 19, and for this reason the centrifugal weights are mounted on the diaphragm in the opposite direction, that is to say pointing towards the shaft 19, the depth of the collar 21 being made sufficienet to accommodate the centrifugal weights. The socket member 22 in which the half-ball valve element 20 is accommodated, is supported in the stationary part 18 by means of a second diaphragm or spider 23, and the axial movement of the centre of the diaphragm 4, as well as the pressure of the loading spring 11, is transmitted to the socket member 22, through a ball-type thrust bearing 24.

In view of the relatively small axial forces available from a governor constructed according to the invention it is desirable, when a relatively heavy flow is to be controlled by the valve, to relieve the valve element from at least part of the pressure of the fuel or other fluid controlled by it without introducing an integral unloading piston, which would be liable to produce friction and thus hysteresis of operation.

Figure 5:
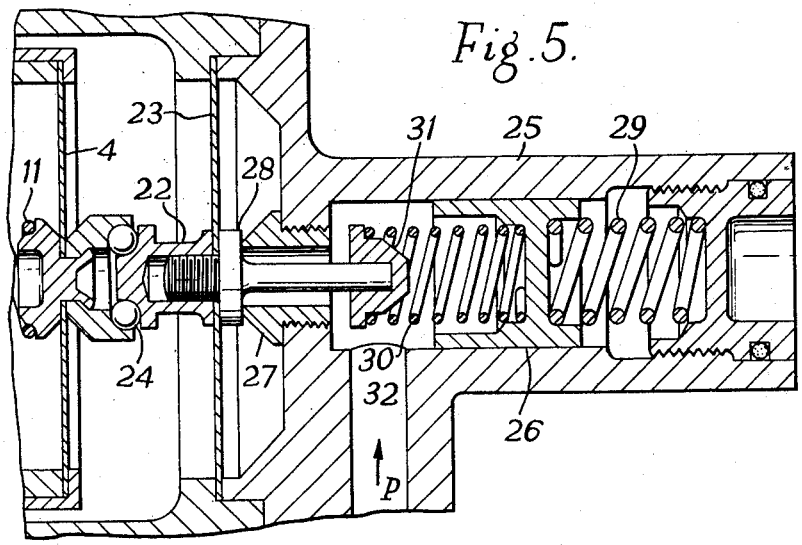
FIGURE 5 illustrates a modification of the construction illustrated in FIGURE 4 which is particularly intended for the control of a comparatively heavy flow with a minimum of friction.

The construction illustrated in FIGURE 5 serves this object. In the stationary part 25 of the device a separate unloading piston 26 is provided having a greater cross-section than that controlled by the valve member 28, for example twice the cross-section, and which acts against the relatively heavy spring 29, while a lighter spring 30, for example of half the rate of the spring 29, is interposed between the piston 26 and the spring abutment 31 which is fixed on the valve 28. 32 indicates the passage through which pressure fluid is supplied to the valve seat. Assuming that, under predetermined conditions of pressure in the passage 32, of preload of spring 11, and of rate of rotation of the governor shaft and diaphragm 4, the valve 28 is balanced, an increase in the pressure in chamber 32 will displace the piston 26 by an amount corresponding to the pressure increase multipled by the area of the piston 26 and divided by the rate of the spring 29, and this displacement will reduce the loading of the lighter spring 30 by an amount corresponding to the displacement of piston 26 multiplied by the rate of spring 30. If this latter rate bears the same ratio to the area of the port controlled by valve 28 as the rate of spring 29 bears to the area of piston 26, the decrease in the loading of spring 30 will exactly balance the increased loading of the valve element 28 due to the increase in pressure in passage 32, so that the final result is equivalent to that of a balanced valve member with the difference however that if due to friction the piston 26 fails to move, this does not prevent the valve from operating.

What I claim is:

1. A centrifugal governor, comprising a control element, a governor shaft, a plane circular diaphragm of resilient material mounted on the governor shaft for rotation about an axis perpendicular to the surface of the diaphragm, said diaphragm being near the two ends of its radii, respectively mounted on the governor shaft and connected to the control element, and a plurality of centrifugal elements supported by and secured on the diaphragm between the respective areas of connection thereof to the shaft and control element, said centrifugal elements being distributed round the axis of rotation so as to be dynamically balanced with relation thereto, and projecting to one side of the diaphragm so that under centrifugal action they will exert upon the diaphragm couples deflecting it axially of the governor shaft against the resilience of the diaphragm, wherein the diaphragm is perforated between the centrifugal elements by slots ending short of the inner and outer peripheries of the diaphragm in such manner that these elements are each supported by a spoke-like arm which is inclined to the radial direction in the plane of the diaphragm so as to extend tangentially to a central portion of the diaphragm, the governor including means for effecting mutual rotation of the control element and governor shaft produced by deflection of the diaphragm.

2. A centrifugal governor as claimed in claim 1, including a helical loading spring arranged co-axially with the diaphragm and opposing, additionally to the resilience of the diaphragm, axial displacement thereof produced by centrifugal action of the centrifugal elements.

3. A governor device including a governor as claimed in claim 2, including a fluid-control valve having a valve seat arranged coaxially with the governor shaft and a valve element coupled to the diaphragm of the governor for movement towards and away from said seat.

4. A governor device as claimed in claim 3, wherein a thrust-bearing is interposed between the valve element and the diaphragm.

5. A centrifugal governor as claimed in claim 2, including a piston constituting a movable abutment for the loading spring, and a further helical spring urging the abutment piston to increase the loading of said loading spring, said piston being subject, with an effective area greater than that of the valve, and in opposition to said further spring, to the pressure existing at the inlet side of said valve.

References Cited in the file of this patent

UNITED STATES PATENTS

| 1,384,113 | Arnold | July 12, 1921 |
| 2,645,237 | Wheeler | July 14, 1953 |

FOREIGN PATENTS

| 806,011 | Great Britain | Dec. 17, 1958 |
| 844,083 | Great Britain | Aug. 10, 1960 |